(12) United States Patent
Al Amer et al.

(10) Patent No.: US 11,095,649 B2
(45) Date of Patent: Aug. 17, 2021

(54) UNI-DIRECTIONAL AND BI-DIRECTIONAL CROSS-DOMAIN (SECURE EXCHANGE GATEWAY) DESIGN

(71) Applicant: Saudi Arabian Oil Company, Dhahran (SA)

(72) Inventors: Mostafa Al Amer, Dhahran (SA); Mohammed K. Ujaimi, Dhahran (SA); Eid S. Harbi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 253 days.

(21) Appl. No.: 16/454,926

(22) Filed: Jun. 27, 2019

(65) Prior Publication Data

US 2020/0412722 A1 Dec. 31, 2020

(51) Int. Cl.
H04L 29/06 (2006.01)

(52) U.S. Cl.
CPC .......... *H04L 63/10* (2013.01); *H04L 63/1416* (2013.01); *H04L 63/20* (2013.01)

(58) Field of Classification Search
CPC ..... H04L 63/10; H04L 63/1416; H04L 63/20; H04L 63/308
USPC .......................................................... 726/4
See application file for complete search history.

(56) References Cited

U.S. PATENT DOCUMENTS

| | | | | |
|---|---|---|---|---|
| 8,380,913 B2 * | 2/2013 | Goldring | ............. | G06F 13/4286 710/315 |
| 8,732,453 B2 * | 5/2014 | Mraz | ..................... | H04L 9/3236 713/153 |
| 2014/0337407 A1 | 11/2014 | Mraz et al. | | |
| 2018/0351930 A1 | 12/2018 | Kim et al. | | |

OTHER PUBLICATIONS

International Search Report in Corresponding PCT Application No. PCT/US2020/040065 dated Mar. 16, 2021. 15 pages.
Kang, M.H., et al., The Pump: A Decade of Covert Fun, Center for High Assurance Computer Systems, Naval Research Laboratory, Washington, DC, hosted at https://www.acsac.org/2005/papers/Kang.pdf, pp. 1-7.
Brochure—"Network Pump—High Assurance "One-Way" Guard", U.S. Naval Research Laboratory, pp. 1-2.
Massey, D., et al., "Fault Detection in Routing Protocols", pp. 1-10.
Gupta, B.K., et al. "Failure Detection and Recovery in Hierarchical Network Using FTN Approach", pp. 1-8.

* cited by examiner

*Primary Examiner* — Longbit Chai
(74) *Attorney, Agent, or Firm* — Leason Ellis LLP

(57) ABSTRACT

A system for enabling secure bidirectional communications on a network is provided, wherein a first server having a first security rating is connected to a second server having a second security rating by a first data channel configured to establish one-way communication from the first server to the second server. A second data channel incorporating a third server is configured to establish one-way communication from the second server back to the first server. The third server has a power switch that controls third server on and off states. The second data channel is enabled when the power switch is turned on. The third server arbitrates the flow of message traffic from the second server back to the first server by applying an on-board security module's encoded set of rules to determine whether the message is permitted to proceed to the first server.

6 Claims, 6 Drawing Sheets

UNI-DIRECTIONAL AND BI-DIRECTIONAL CROSS-DOMAIN (SECURE EXCHANGE GATEWAY) DESIGN

FIELD OF THE DISCLOSURE

This patent application generally relates to enabling bidirectional data traffic on secure information technology systems that incorporate unidirectional components. More particularly, the present invention provides methods and systems whereby a secure one-way data channel that connects a high-security network to a low-security network is provided with an alternate secure channel that allows reverse data traffic from the low-security network to the high-security network when needed for the operation of mission-critical applications or to satisfy operational requirements.

BACKGROUND OF THE DISCLOSURE

The need for information technology security protocols and procedures has existed since the earliest computer networks were created by connecting widely-separated nodes by means of copper-wire telephone lines. Reliance on phone lines meant that most of the circuits physically existed in public space, leaving data vulnerable to eavesdropping and data-pilfering by means of wiretaps, or inadvertent disclosure through the phenomenon known as "crosstalk," wherein undesired electromagnetic effects between two closely-situated circuits or channels causes the signal traveling over the first circuit to "leak" over to the second circuit.

One early but impractical solution to protect sensitive networks was to ensure that they were physically isolated from unsecured networks, making data transfer with potentially suspect networks impossible. While the idea of making a network perfectly safe by physically isolating it from the environment had understandable initial appeal, the practice ultimately proved to be self-defeating in an increasingly connected and fast-paced world. It's neither practical nor economically feasible to have to rely on a sort of "manual handover" process whereby human operators fill the roles of key interfaces in the system, passing input and output messages between disconnected systems. Ultimately, network owners realized that practical networks could not remain physically isolated and that some public infrastructure would be needed to implement large-scale networks. It became clear that network security would need to be provided entirely by the network infrastructure and components that were under the control of the entity in need of data security.

A better answer to the problem of data security in a world in which many unaccountable actors would exploit an unsecured network has been to develop solutions that combine hardware and software components to bar communications with sources that lack the proper trusted credentials. The policies of the entity that owns the network, as well as information technology (IT) best practices and the awareness of known threats that network administrators and IT security specialists should possess, will dictate the formal security policies that are implemented in the hardware/software solutions that act as a "traffic cop" at all connections to external networks. The network security solution as implemented in hardware and software will enforce the entity's security policies to allow traffic in possession of the proper credentials to continue through to the protected network.

An additional strategy that is effective to isolate and secure critical network infrastructure from lower-security or unknown and potentially dangerous networks and online entities is to only allow one-way traffic along sensitive connections to untrusted nodes. One such solution is the data diode, a hardware component that enforces one-way data transmission along a data channel or circuit. Data diode technology has proved effective at isolating sensitive networks from attempted intrusions and outright attacks, by both lone wolf hackers and nation-states with military units trained in cyberwarfare. In fact, the technology works so well that the national electrical grids of several countries, including the U.S., are protected by these devices. Military command and control structures are protected by data diode technology, and the Nuclear Regulatory Commission mandates their use to harden the defenses of nuclear power plant controls against terrorist and other criminal incursions.

While the data diode is an excellent tool in the implementation of physical security for a sensitive computer network, its inflexibility can occasionally present problems for network infrastructure designers as a network evolves over time. Changing operational requirements or enterprise policies that were not foreseen at the inception of the network can be effectively barred from being implemented within the framework of the current network design. A network's topology, as well as its selection of components such as data diodes and their function, can make it nearly impossible to make necessary changes to a network's operation, at least not without prohibitive expense. The present invention provides a novel solution to these and other problems by adding a component that enables secure bidirectional communications capability to a network connection that has been built using physical and logical controls.

SUMMARY OF THE DISCLOSURE

In one aspect of the invention, a system for enabling bidirectional communications on a network built using logical controls, wherein a first server having a first security rating is connected to a second server having a second security rating by a first data channel configured to establish one-way communication from the first server to the second server. A second data channel incorporating a third server is configured to establish one-way communication from the second server back to the first server. The third server has a power switch that controls third server on and off states; the second data channel is enabled when the power switch is turned on.

According to a further aspect, the third server arbitrates the flow of message traffic from the second server back to the first server by applying an on-board security module's encoded set of rules to determine whether the message is permitted to proceed to the first server, and then the third server resolves the message path back to the first server by accessing a routing table.

According to a further aspect, cooperating pairs of bi-directional small form-factor pluggable transceivers (BiDi SFPs) join at least the first and second servers over an optical fiber connection. Software running on at least one of the servers in the server-to-server connection can be configured to disable the transmitter optical outputs for one of the BiDi SFP pairs to constrain communications to nominally be from the high security server to the low security server, and not in the other direction.

According to a still further aspect, a fail-safe solution is provided whereby the power switch is forced to an off state immediately upon detection of a defect or failure in either the security module or the routing table.

BRIEF DESCRIPTION OF THE DRAWINGS

The accompanying drawing figures illustrate exemplary embodiments and are not intended to be limiting of the invention. Among the drawing figures, like references are intended to refer to like or corresponding parts.

DETAILED DESCRIPTION OF CERTAIN EMBODIMENTS ACCORDING TO THE DISCLOSURE

The invention encompassed by the present disclosure is now described with reference to the accompanying drawings, which form a part hereof, and which show, by way of illustration, example implementations and/or embodiments of the present invention. It is to be understood that other embodiments can be implemented and structural changes can be made without departing from the spirit of the present invention. Among other things, for example, the disclosed subject matter can be embodied as methods, devices, components, or systems.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

Figure 1:
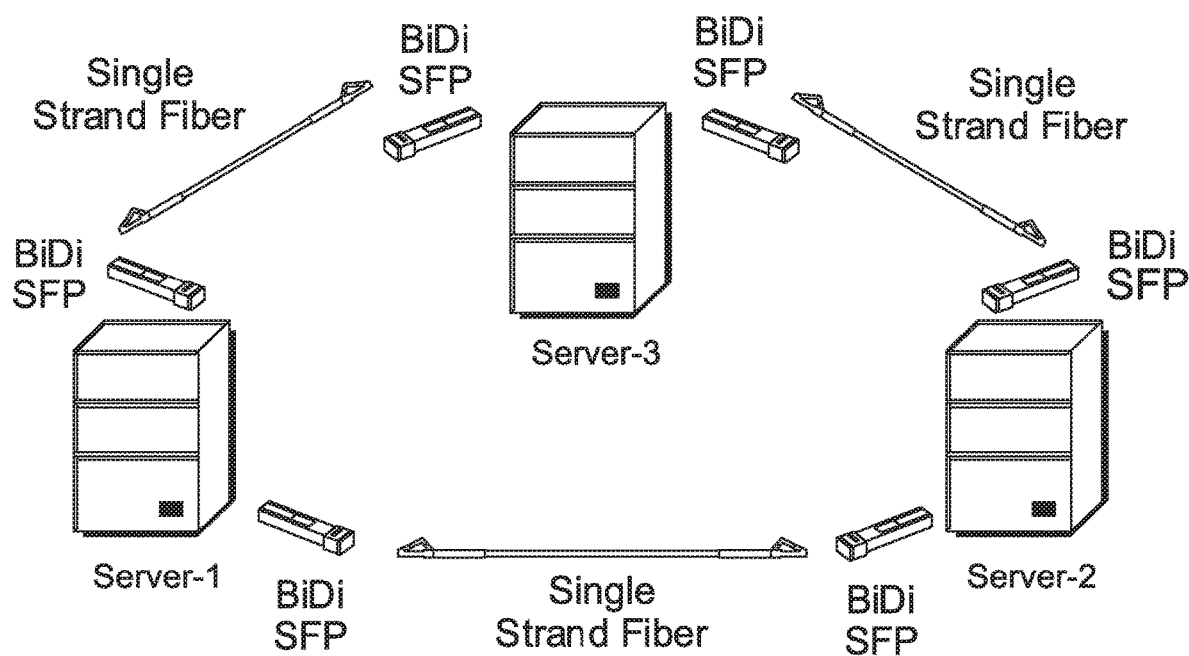
FIG. 1 illustrates a schematic overview of the invention, wherein Bi-Directional Small Form-factor Pluggable ("BiDi SFP") transceivers are used to implement all server-to-server connections.

The methods and systems described herein concern networks having different levels of security which are connected by Bi-Directional Small Form-factor Pluggable ("BiDi SFP") transceivers configured by software running on the respective servers to effect one-way-only data transmission. The present arrangement of implementing one-way data transmission using a BiDi SFP protects a high-security, restricted network from potentially dangerous message traffic transmitted by unknown or suspect networked entities, and, more particularly, protects the high-security, restricted network from network traffic which has payloads or instructions that go beyond a mere "acknowledgement" from a different network. A schematic overview of one arrangement in accordance with the present disclosure is shown in FIG. 1, wherein BiDi SFPs are used in conjunction with optical fibers, e.g., single mode, single fiber connections, to implement all server-to-server connections.

A BiDi SFP transceiver is a compact, hot swappable, input/output optical transceiver that can be used to provide data connections between digital equipment through a single optical fiber. BiDi optical transceivers improve upon traditional optical transceivers by incorporating wavelength division multiplexing (WDM) diplexers, capable of combining and separating data transmitted over a single fiber based on the wavelengths of each optical carrier signal. While a conventional optical module has two ports, namely, a transmit port TX and a receive port RX, a BiDi transceiver has only one port through which to transmit an optical signal and receive an optical signal. The wavelength for signal transmission and reception in and out of the BiDi SFP devices is at standard frequencies, such as, by way of example and not limitation, at 1310 nm and 1550 nm, or vice versa. This arrangement requires that the BiDi transceivers be deployed in matched pairs with their diplexers tuned to match the expected wavelength of the complementary transmitter and receiver. BiDi optical transceivers can establish bi-directional data links spanning distances as great as 120 km over single-mode fiber. BiDi SFP transceivers have a wide variety of applications, including: passive optical networks (PON) and point-to-point, digital video and closed-circuit television (CCTV) applications, inter-system communication between servers, switches, routers, optical add-drop multiplexer (OADM), WDM fast Ethernet links, SDH/STM-1, SONET/OC3, metropolitan area networks and other optical links.

Figure 2:
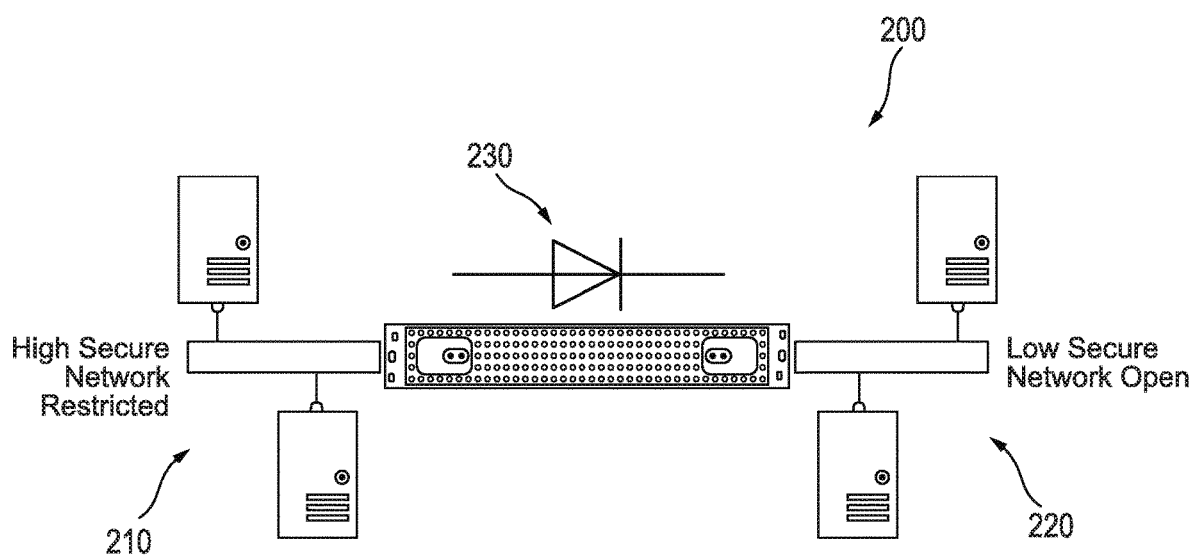
FIG. 2 illustrates a schematic view of two networks connected by a data diode.

Referring now to FIG. 2, a system 200 is presented which is a conventional prior art approach to connecting a high security network 210 having restricted access to a low security network 220 having open access. The connection is by a data diode 230. The data diode 230 can be as disclosed in U.S. Pat. No. 8,380,913 to Goldring (hereinafter "Goldring"), which is hereby incorporated by reference. In the arrangement shown in FIG. 2, data traffic flows in one direction through the data diode 230, from the high security network 210 to the low security network 220. The data diode 230 blocks all reverse data traffic from the low security network 220 to the high security network 210. This type of arrangement can be employed in scenarios in which a program or authorized entity within the high security network issues commands to lower-ranking entities or programs further down the chain of command which are outside of the high secure network. Decisions and processes of the high-ranking program or entity of a type that can proceed without input from any lower-ranking entity are protected by the data diode 230 from extraneous and unnecessary messages, or even potential attacks.

Figure 3:
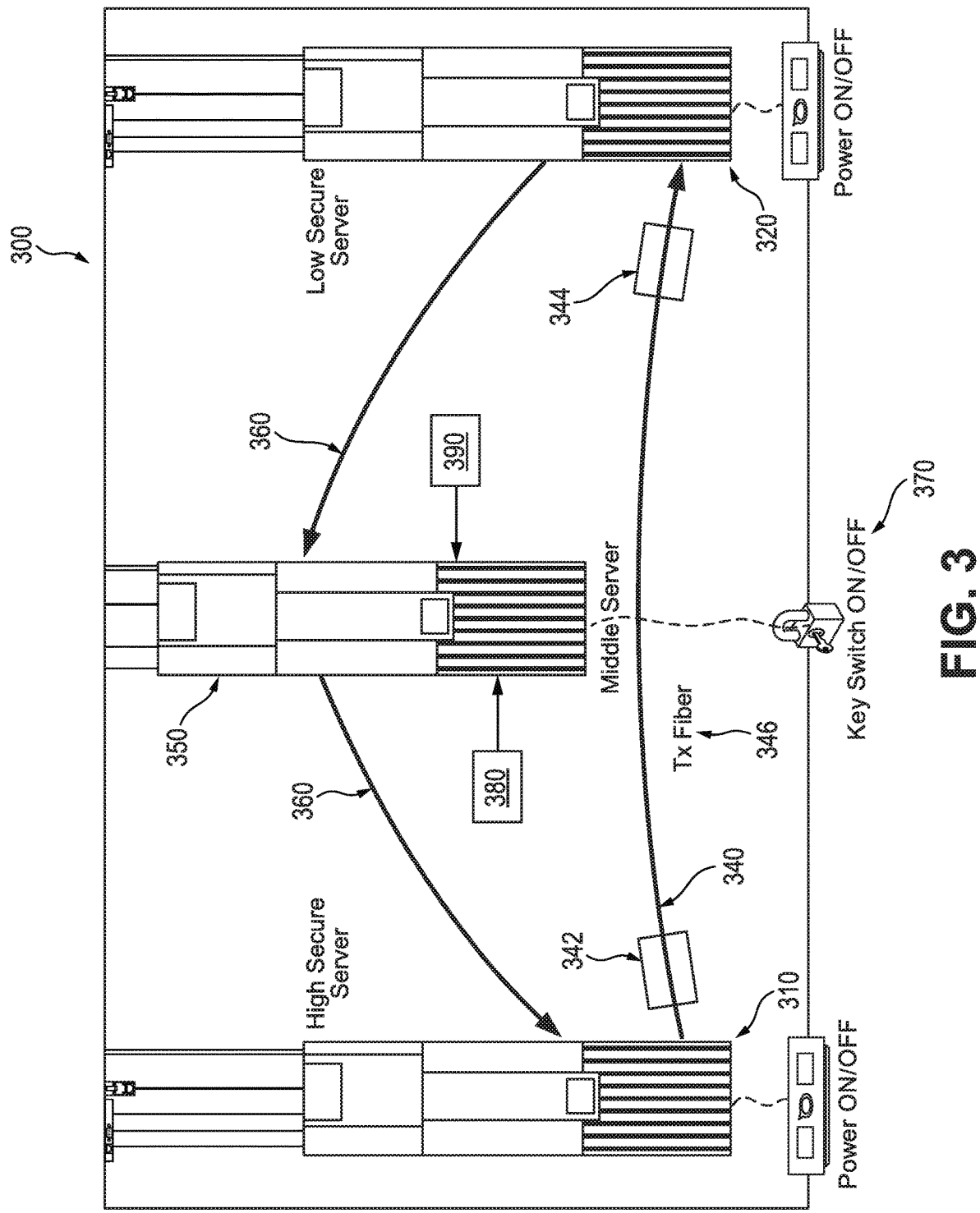
FIG. 3 illustrates a schematic view of the bidirectional communications network of the present invention.

Turning to FIG. 3, a network arrangement 300 in accordance with the present disclosure has a first server 310 belonging to a high security network having restricted access shown connected to a second server 320 belonging to a low security network having open access. The connection is by way of a first data channel 340 which is configured to establish one-way communication from the first server 310 to the second server 320. In the arrangement shown in FIG. 3, the first data channel 340 is implemented by using cooperating pairs of bi-directional small form-factor pluggable transceivers (BiDi SFPs) 342, 344 in conjunction with an optical fiber 346 to connect the first server 310 to the second server 320.

Figure 3A:
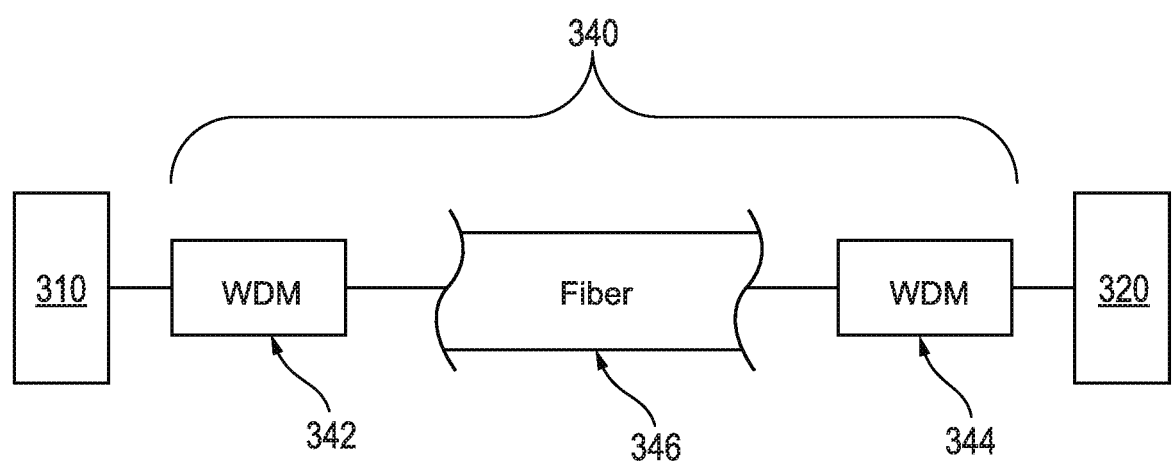
FIG. 3A is a schematic view of the first data channel of the invention.

This architecture of the first data channel 340 is shown in detail in FIG. 3A, wherein a single-mode strand of optical fiber 346 extends between a pair of BiDi SFPs 342, 344. The paired BiDi SFPs bear the symbol "WDM" to indicate the fact that they utilize wavelength-division multiplexing (WDM) to carry multiple optical carrier signals on a single optical fiber using different wavelengths of laser light. This technology enables bidirectional communications over a single fiber and multiplies capacity.

Figure 3B:
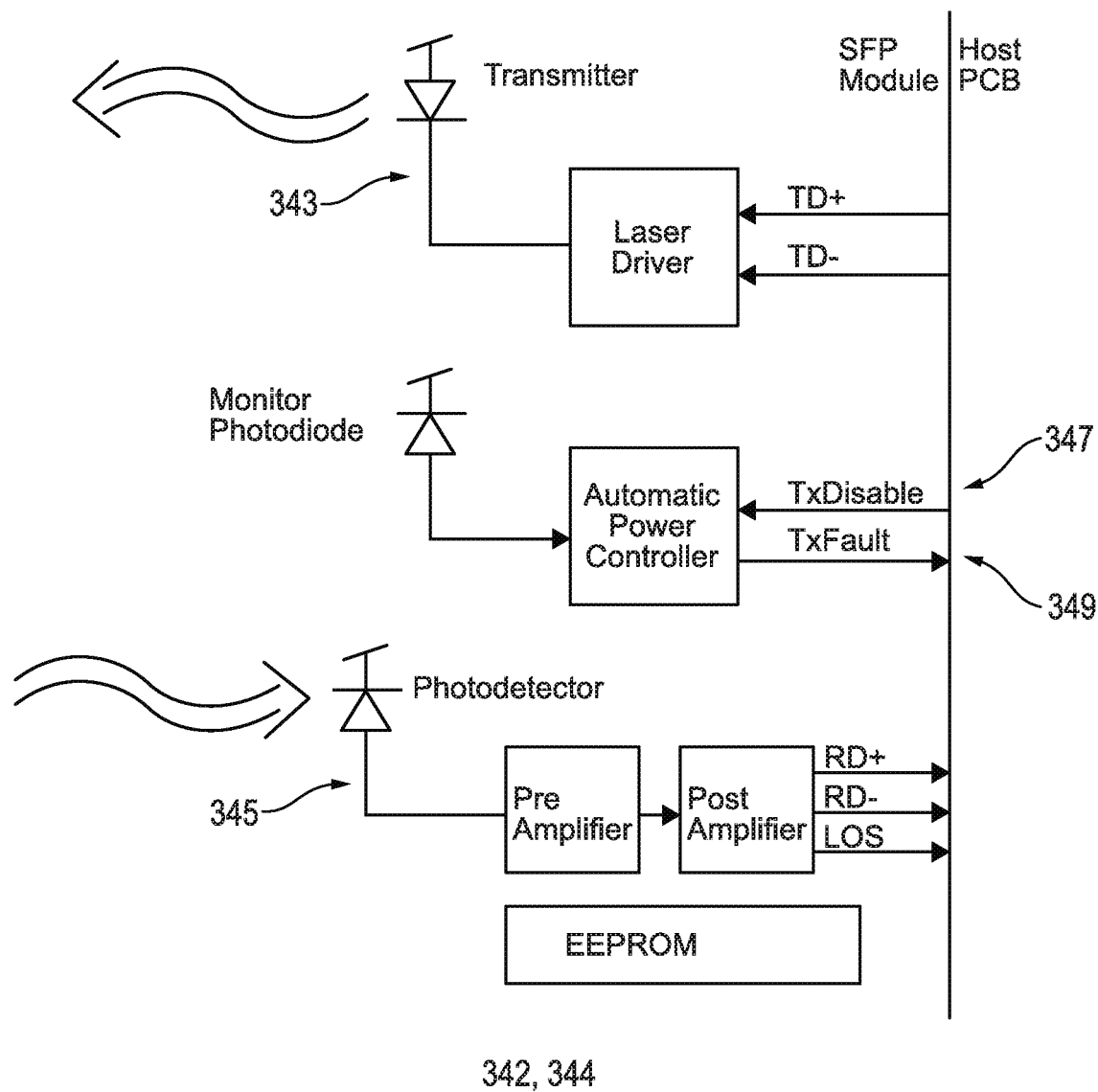
FIG. 3B is a schematic view of the connections embodied in a representative BiDi SFP of a BiDi pair.

FIG. 3B is a schematic diagram of the connections embodied in a single representative BiDi SFP 342 or 344. Optical transmitter 343 and photodetector 345 are shown, along with the automatic power controller pinouts 347, 349. These are conventional components of BiDi SFP devices, which have standard set of 20 pinouts to connect to a host printed circuit board (PCB). Among the pinouts of the SFP module are a TxDisable pinout 347, which enables the transmitter optical output to be disabled, while TxFault pinout 349 indicates if a laser fault has occurred. In accordance with a salient aspect of the present invention, software running on at least one of the first and second servers 310, 320 can be configured to control the TxDisable pinout 347 of the BiDi SFP device associated with the low security server 320 (namely, BiDi SFP 344) to disable the transmitter optical output, thereby precluding communication from the second server 320 along the first data channel 340 back to the first server because, in this condition, the BiDi SFP device associated with the second server 320 is configured to monitor incoming optical signals and incapable of communicating data or anything else over the connecting optical fiber 346. In other words, the disabling of the TxDisable pin at the host PCB (e.g., by setting or letting the signal float to a logic high voltage) blocks all reverse data traffic from the low security network 320 to the high security network 310. This concept can be implemented at all server-to-server connections along data channels of the present invention to control information exchange from the second server to the first server, as discussed further below.

In accordance with a salient aspect of the present disclosure, and referring again to FIG. 3, the network arrangement 300 includes a third server 350 having a processor 352 and a memory 354 including code and BIOS configured to enable communication over separate communication channels between the first and second servers 310, 320. In particular, server 350 introduces to the network arrangement 300 a second data channel 360 which connects the second server 320 to the first server 310 through the third server 350 by way of further, respective pairs of BiDi SFP devices which can be of the same construction as devices 342, 344. A power switch 370 integral to the third server 350 actively switches the second data channel 360 between on and off states in response to control signals, as described further below. The second data channel 360 is enabled when the power switch 370 is in the on state, though is configured to selectively pass traffic from the third server under control of a logical configuration provided by a security module 380, which can include filters and other features described further below, and to otherwise impede the second data channel from transmitting any information traffic. The second data channel 360 is disabled at least whenever the power switch 370 is in the off state.

In implementations in which there is no direct communication between the low server 320 and the high server 310 via the first data channel 340 (e.g., rules, filters, or a disabling of the BiDi 344 transmitter), then reverse direction communication from the low security second server 320 back to the high security first server 310 is performed over the second data channel 360. During normal operation of the system, the power switch 370 can be in the off state, absolutely barring any reverse traffic from second server 320 by forcing the second data channel 360 into an open-circuit condition. Periodically, enterprise operating conditions may warrant or even necessitate the high security first server 310 to receive data from the low security second server 320. For example, from time to time it may be desired to audit the integrity of messages that have been transmitted from the first server 310 to the second server 320 or to log information pertaining to these messages for transmission back to the first server 310. It is when such relatively infrequent conditions of necessity exist that the power switch 370 can be set to the on state so that the third server 350 can, under control of rules, tables, and security features, enable traffic on the second data channel 360. The second data channel 360 is enabled under control of software-based security features that programmatically establish absolute control over message traffic on the second data channel 360.

Figure 4:
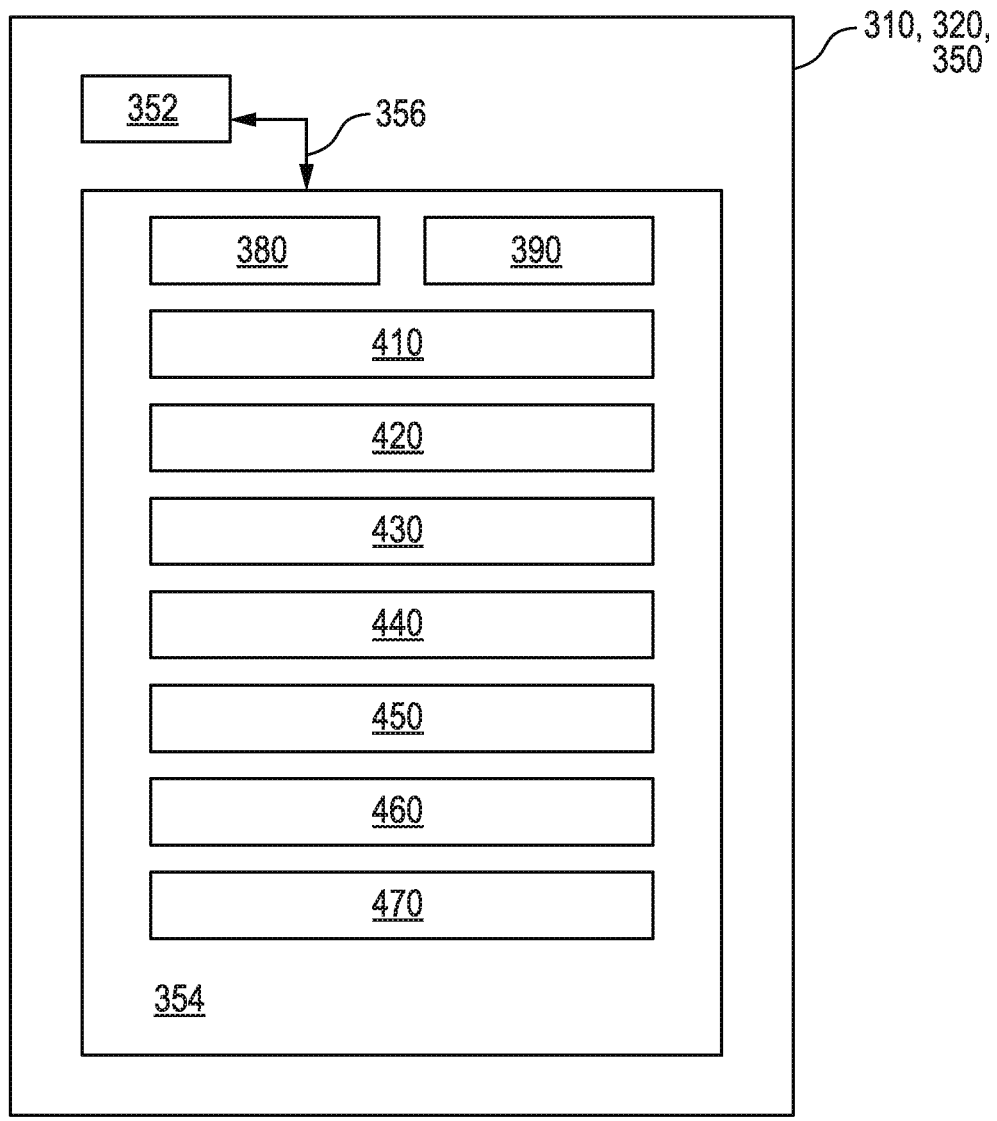
FIG. 4 illustrates a schematic block diagram of program modules, one or more of which can be included in particular implementations in accordance with the disclosure.

The third server 350 is configured to exercise continuous positive control over message traffic originating at the second server 320 which is intended to go to the first server 310, that is, in the direction prohibited by one-way data channel 340. The third server 350 applies an on-board security module 380 having encoded rules executed by a processor of the third server 350. The rules and tables 390 utilized by the security module 380 pertain to message security, priority, mission criticality, and optionally further criteria can be employed to arbitrate (determine) which messages are terminated in transit and which messages are permitted to proceed through to the first server 310, using one or more of the modules illustrated in FIG. 4, discussed below. In part, after the security module 380 determines that a given message from second server 320 is permitted to proceed to the first server 310, it accesses a routing table 390 to resolve the route by which the message will proceed back to the first server 310. The security module 380 is stored in the memory 354, optionally together with additional modules 410-470 (see FIG. 4), and it is in communication with the processor 354 over a communication bus 356.

The security module 380 running on the third server 350 is an encoded set of rules that determine whether the message originating from the second server 320 is permitted to proceed back to the first server 310 along second data channel 360. The security module is comprised of at least one of several constituent modules, including: rules chains for the treatment of data packets, anti-malware software, next-generation firewall software, application whitelisting using regular expression, and XML Schema Definition (XSD) implementation to validate XML data. For instance, the "iptables" program available through the Netfilter.org project is a utility program that enables a system administrator to define the tables containing chains of rules for the treatment of data packets. As understood by those of ordinary skill in the art, IP tables can be used to filter traffic based on source/destination IP address and protocol ports. The Iptables program is a user-space (as opposed to kernel-space) utility program by which a system administrator can configure tables provided by the Linux kernel firewall. Iptables enables the system administrator to define the tables containing chains of rules that govern the treatment of packets. Fundamentally, iptables is a Linux-based command line firewall utility that executes decisions to allow or block message traffic based upon criteria such as source/destination port, IP address, and other message parameters. For example, the command "iptables -A INPUT -p tcp -s 10.1.1.1/32 --dport 1433 -m conntrack --ctstate NEW,ESTABLISHED -j ACCEPT" specifies a chain that accepts all incoming connections from address 10.1.1.1/32 through port 1433. As another example, the command "iptables -A OUTPUT -o eth2 -p tcp --sport 1433 -m conntrack --ctstate ESTABLISHED -j ACCEPT" specifies a command that allows outgoing connections from eth2 devices through port 1433. Using a utility such as this, the security module 380 can be provided with commands or scripts that are run by the processor in the third server 350.

The third server 350 can employ additional methods and technologies to control message traffic attempting to flow from second server 320 back to first server 310. For instance, message traffic can be controlled as a function of on-board anti-virus or anti-malware software executing to scan files originating from the network of the second server 320. Such programs are known in the art and can flag digital information (e.g., files, code snippets, messages, etc.) for the presence of a virus or malware code. Such scanning can be for code matching or behavior matching, as understood in the art. Only those files that test clean of malware and which are determined by such software to be virus-free will be cleared for transmission to the first server 310 over the second data channel 360, provided, of course, that the message has satisfied any other controls and safeguards required by the third server 320 before being permitted to proceed beyond the third server 320. The malware and anti-virus software is accessible to and executed by the processor of the third server, from anti-virus module 410 and malware module 420. These modules can comprise executable code and can be any conventional commercially available solution.

In certain embodiments, the third server 350 also can incorporate a firewall 430. In one implementation, the firewall 430 is a so-called Next-Generation Firewall, that is, the latest in firewall technology that combines a traditional firewall with other network device filtering functionalities such as in-line deep packet inspection (DPI) and an intrusion prevention system (IPS). The Next-Gen firewall can include URL filtering and anti-virus features to augment or in lieu of the anti-virus module 410. The firewall can be a separate appliance than the third server 350, or it can comprise code executing within the third server.

In certain implementations, an application Whitelisting module 440 uses Regular Expression (RegEx) to validate inputs. A Regular Expression comprises a sequence of characters that can be searched with the aid of filtering algorithms. By this technique, traffic can be analyzed at the third server 350 by executing code or otherwise applying the filter to the message to identify messages that satisfy the filter criteria and therefore qualify for whitelisting. Messages that qualify for whitelisting are not precluded from continuing on via the second data channel 360 toward the first server 310.

In certain implementations, an XML Schema Definition (XSD) validation module 450 is used to validate the structure and the content of XML data that is encountered as it passes through the third server 350, in a conventional manner, by executing code or otherwise applying the definition to confirm that the message satisfies the XML schema definition.

In a given implementation, the third server has any combination of the modules 410, 420, 430, 440, and 450, including all of these modules, and is configured to apply the code, scripts, or tables to incoming messages in connection with the determination whether to permit message traffic over the second data channel 360 to the first server 310, or whether to impede message traffic from traveling over the second data channel 360 to the first server 310.

In one particular implementation, the high security first server 310 and the low security second server 320 each have the security module 380, application whitelisting module 440, and XSD validation module 450 to establish and maintain security control over message traffic on their respective sides of the data-diode.

Several checks can be included in systems and methods constructed in accordance with the present disclosure. For instance, the third server 350 can include a fail-safe scheme whereby the power switch 370 is forced to an off state immediately and automatically upon detection of a defect or failure in either the routing protocol or the routing table. The systems and tools used to detect faults in routing protocols or tables can be generally classified as either active monitoring tools or passive monitoring tools.

Active monitoring tools work by adding an input to the system and then monitoring for an expected result. Passive tools observe the system over time and report any unusual events. The most well-known active fault detection tools are route tracing tools. One example is the "traceroute" tool, which sends packets of varying lifetimes to learn the route to a specific destination. A more advanced version of traceroute called "pathchar" sends more packets and generates more statistics, for example, the estimated throughput on each link. The "mtrace" tool traces the multicast route, wherein data transmission is addressed to a group of destination computers simultaneously, from a destination to a source using special Internet Group Management Protocol (IGMP) messages. In certain implementations, the third server includes at least one active monitoring tool 460 which executes in the processor of the third server to provide the aforementioned functionality.

Passive fault detection, on the other hand, is most commonly done using the well-known management protocol SNMP, or Simple Network Management Protocol. SNMP, which is widely used in network management to monitor networks, is an Internet Standard protocol employed to collect and organize information about managed devices on IP networks and to modify that information when a change in device behavior is desired or needed. Cable modems, routers, switches, servers, workstations, printers, and more are some of the devices that typically support SNMP. SNMP makes system management variables available in the form of an organized management information base (MIB), which describes system status and configuration. Managing applications can then remotely query, and in certain circumstances modify, these variables. When used as part of a passive fault detection method, an SNMP agent will send a request asking for a specific MIB variable, and the device maintaining the MIB returns the result. SNMP can also manage authorizations for access to data to ensure that only entities having the required permissions can query a specific device.

Software running on third server 350 can monitor the status of first server 310 and second server 320 and detect potential problems by polling the servers. For instance, in certain implementations, the third server includes at least one passive fault detection tool 460 which executes in the processor of the third server to provide the such functionality. If the information returned by the polling indicates a possible fault, the third server 350 can immediately force the power switch 370 to an off state, disabling the second communication channel 360 and thereby precluding message traffic which might otherwise transit back to the high security network (through at least the first server 310) from the low-security network (that is, from at least the second server 320).

Furthermore, like all server devices, the third server 350 is continuously collecting and analyzing telemetry related to its operations, and such information can be used by the passive fault detection tool 470. Any divergence from the expected performance parameters, even for a brief period, provides an indication of problems that may be developing on the network. Whether theses anomalies are caused by flaws in the network infrastructure, suboptimal network architecture or routing policies, or an actual attack, the detection and response by third server 350 under such a condition can be immediate. The response to such a detected condition can be to shut down the power to the third server or can be a change in the logical configuration to better ensure that all message traffic bound for the second data channel 360 is impeded until the third server 350 is reset in one way or another.

Some examples of telemetry indicators used to monitor network status include CPU load, network traffic rates (both in terms of bandwidth and throughput), and link flaps, which is condition wherein a communications link alternates between up and down states. Such information can be utilized by the fault detection tool 470 to identify anomalies and trigger a change in the operational stage of the second data channel 360.

Regarding spikes in CPU load on network infrastructure devices, they are often an indication that some sort of event is taking place. However, a high CPU load is not necessarily an indicator of malicious activity in and of itself. The trend shown by the CPU loading must also be considered before a spike can be classified as an attack. This is done by correlating CPU utilization history with other information such as network traffic statistics and routing-table changes. For at least this reason, a baseline of CPU utilization can be maintained over time to provide a benchmark. This enables monitoring software running on the third server 350 to analyze a present anomaly by comparing it to baseline data, and if performance and/or security thresholds indicative of a problem are exceeded, the third server can immediately set power switch 370 to an off state, disabling second data channel 360 until further investigation and possible remediation is completed. Alternatively, the response to such a determination can be a change in the logical configuration to better ensure that all message traffic bound for the second data channel 360 is impeded until the third server is reset in one way or another.

Data traffic rates are also useful telemetry by which software executing on third server 350 can detect and discern behaviors that may indicate an attack. Bandwidth (bps) and/or throughput (pps) rated as excessive compared to normal network traffic levels can indicate the presence of undesirable traffic, as Denial-of-service (DoS) attacks and DoS-like worms have been known to cause high amounts of traffic. However, high traffic levels are not always indicative of problems, as certain situations in the normal course of business can be expected to cause a surge in network traffic. Once again, having a telemetry baseline to detect possibly anomalous or dangerous activity provides a criterion for determining whether traffic is to be permitted to flow through the third server 350 to the first server 310. The third server 350's software can be programmed to alert a system administrator or a module operating on that server or another concerning high bps and/or high pps, as well as drops in link speed or number of routes. When any of these measures reach levels that have been deemed indicative of potential problems (that is, they cross baseline, threshold or prescribed values or ranges), the third server can immediately set power switch 370 to an off state, disabling second data channel 360 pending further investigation, and if necessary, remediation. Alternatively, the response to such a condition can be a change in the logical configuration to better ensure that all message traffic bound for the second data channel 360 is impeded until the condition is assessed by an administrator or remediated by an automated module.

An additional telemetry item that the third server 350 can use to programmatically detect a possible problem is the occurrence of link-flaps, which is a condition where a communications link alternates between up and down states. When they do occur, link flaps are most often an indication of system misconfiguration, but malicious activity such as a DoS attack can sometimes be the cause. The routers and switches integral to the third server 350 can be configured to notify monitoring software running on third server 350 when a link flap occurs. As in the cases of CPU load and data traffic rates, maintaining a telemetry baseline provides a criterion for determining whether traffic is to be permitted to flow through the third server 350 to the first server 310. For example, it may be the case that some degree of flapping has been known to occur during certain operational conditions of the system, based upon historical data. Nevertheless, the third server 350 stands ready to immediately set power switch 370 to an off state, disabling second data channel 360, if any telemetry reaches levels that have been deemed indicative of potential problems. Alternatively, the response to such a condition can be a change in the logical configuration to better ensure that all message traffic bound for the second data channel 360 is impeded until the condition is assessed by an administrator or remediated by an automated module.

The security module's 380 encoded set of rules can include a prescribed security rating of the second server 320 or an application executing thereon which is trying to send information to the first server 310 for comparison to a threshold value or range, a prescribed priority rating, again for comparison to a threshold value or range, a mission criticality rating of the information trying to be conveyed to the first server, as well as rules which require any combination of the foregoing. These rules are executed by the security module 380 and are determinants as to whether an individual message from the second server 320 will be allowed to proceed back to the first server 310.

It should be appreciated that the first and second servers 310, 320 can each have their respective processor's configured to exercise continuous positive control over message traffic in the same way as server 350, with the rules and filters tailored to account for permitted and excluded traffic from a given network and proposed to be sent to a given network.

References to the second server 320 should be understood to be one or more servers on the low security network (LAN or WAN) which have a need or desire to transmit information to the first server 310 on the high security network, which also can comprise a set of servers (LAN or WAN), and that the third server 350 is configured to selectively bridge communications between the respective second and first servers 320, 310 in order to positively control a limited exchange of information along the second data channel 360 to the high security network.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the invention.

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

What is claimed:

1. A system for enabling secure bidirectional communications on a network, comprising:
   a first server having a first processor device, a first memory, first onboard storage, and a first security rating;
   a second server having a second processor device, a second memory, second onboard storage, and a second security rating;
   a first data channel configured to establish one-way communication from the first server to the second server;
   a second data channel configured to establish one-way communication from the second server to the first server, the second data channel comprising:
      a third server disposed between the second server and the first server along the second data channel, the third server comprising:
         a third processor device, a third memory, and third onboard storage;
         a security module running on the third server to process messages originating from the second server, wherein the security module comprises an encoded set of rules that determine whether the message is permitted to proceed to the first server based on, at least, the security ratings of the first server, the second server and a security rating of the originated message;
         a routing table loaded from the third onboard storage to the third memory and accessible by the third processor device in response to incoming data traffic from the second server, wherein the routing table comprises a data table that lists the routes to specific network destinations associated with the first server; and
         a power switch designated to be used in conjunction with, at least, an operating state of the security module or the routing table.

2. The system according to claim 1, further comprising cooperating pairs of bi-directional small form-factor pluggable transceiver devices (BiDi SFPs), connected to respective pairs of the first, second and third servers, and an optical fiber connected between each cooperating pair of BiDi devices to implement server-to-server connections along each of the data channels.

3. The system according to claim 2, wherein software running on at least one server in a server-to-server connection disables a transmitter optical output of the BiDi SFP device connected thereto to establish one-way communication.

4. The system according to claim 1, wherein the security module comprises at least one of the following constituent modules: rules chains for the treatment of data packets, anti-malware software, next-generation firewall software, application whitelisting using regular expression, and XML Schema Definition (XSD) implementation to validate XML data.

5. The system according to claim 1, the third server further comprising a fail-safe solution whereby the power switch is forced to an off state immediately upon detection of a defect or failure in either the security module or the routing table.

6. The system according to claim 1, wherein the security module's encoded set of rules further comprise:
   comparing the second server's security rating to a security threshold;
   comparing a priority rating of the message to a priority threshold; and
   comparing a mission criticality rating of the message to a mission criticality threshold.

* * * * *